(12) United States Patent
Mackjust et al.

(10) Patent No.: US 8,378,800 B2
(45) Date of Patent: Feb. 19, 2013

(54) SECURITY SYSTEM AND METHOD FOR OPERATING THE SAME

(75) Inventors: Tyson James Mackjust, Vista, CA (US); Joseph Kunkel, Valley Center, CA (US)

(73) Assignee: DEI Headquarters, Inc., Vista, CA (US)

( * ) Notice: Subject to any disclaimer, the term of this patent is extended or adjusted under 35 U.S.C. 154(b) by 327 days.

(21) Appl. No.: 12/924,447

(22) Filed: Sep. 28, 2010

(65) Prior Publication Data

US 2011/0074561 A1 Mar. 31, 2011

Related U.S. Application Data

(60) Provisional application No. 61/247,529, filed on Sep. 30, 2009.

(51) Int. Cl.
*B60R 25/10* (2006.01)
*G05B 11/01* (2006.01)
*F02N 11/08* (2006.01)

(52) U.S. Cl. .......... 340/426.13; 340/426.1; 340/426.15; 340/426.18; 340/542; 340/12.22; 123/179.2; 701/2

(58) Field of Classification Search ............. 340/426.13; 123/179.2
See application file for complete search history.

(56) References Cited

U.S. PATENT DOCUMENTS

| | | | | |
|---|---|---|---|---|
| 6,724,322 B2 * | 4/2004 | Tang et al. | .................... | 340/989 |
| 6,937,141 B2 * | 8/2005 | Muramatsu | .............. | 340/426.13 |
| 7,248,150 B2 * | 7/2007 | Mackjust et al. | ........ | 340/426.13 |

* cited by examiner

*Primary Examiner* — Donnie Crosland
(74) *Attorney, Agent, or Firm* — K C Bean, Esq.

(57) ABSTRACT

A security system is disclosed with a digital processor-based wireless remote controller that sends command to perform system operations and receive confirmation of various aspects of the system. The security system monitors environmental and vehicle system parameters and automatically provides commands or prohibits issuance of commands to operate vehicles systems based on preset environmental and vehicle system conditions. The system reports command and response status to users through the remote controller.

16 Claims, 8 Drawing Sheets

SECURITY SYSTEM AND METHOD FOR OPERATING THE SAME

CROSS-REFERENCE TO RELATED PATENTS

This application claims priority based on U.S. Provisional Patent Applications No. 61/247,592 filed on Sep. 30, 2009, and titled Security Systems and Methods for Operating Same.

FIELD OF INVENTION

The present invention relates generally to security systems, and more particularly, to remotely controlled security systems installed in automobiles and other vehicles.

BACKGROUND OF INVENTION

Remote controllers are widely used to operate security systems, including security systems installed in automobiles and other vehicles. In general, a security system with remote control capability includes (1) a remote controller, or simply a remote control, for the operator of the vehicle to carry, and (2) a base system installed or installable in a vehicle and in communication with the vehicles systems such as door locks, starter system, data bus system, etc., and controlled, operated, and/or monitored by the remote controller. Thus, a remote controller is a device through which the operation of one or more vehicle systems can be monitored and/or controlled by transmission and reception of control and monitoring information.

Remote control systems are generally wireless systems. By "wireless" we mean that no direct mechanical connection needs to exist between the base system and its corresponding remote controller, to exchange control and/or monitoring information. Instead, the remote controller and the base system exchange information over a wireless link. Typically, the wireless link is a radio frequency (RF) link, including a link implemented over a microwave frequency band. The link can also be an ultrasound link, with the remote controller and the base system exchanging information by ultrasound signals. The link can also be an infrared (IR) link. These are only some of the more common wireless links, and we do not exclude any other electromagnetic or sound frequencies from the scope of the word wireless in the present context.

With the progress of electronic industry over the years, the capabilities of remote controls have increased substantially. For example, many of the early RF remote control transmitters used only the operating frequency and time (duration) of transmission to operate their base systems. Today, there are digitally encoded, frequency hopping and direct sequence spread spectrum remote control transmitters with code hopping or code rolling capabilities. Sophisticated encryption algorithms are sometimes used for transmissions over control links, making it difficult to duplicate a particular remote control transmitter without knowledge of its operating scheme. In sum, the technological field of remote control systems has grown and advanced with other electronic technologies.

Some of the technological advances have enabled miniature and relatively inexpensive electronic circuitry within a transmitter to operate many more functions of the vehicles systems through the base system than could be operated in the past. These developments have not gone unnoticed by product designers. The trend is to have more and more switches and keys on a remote controller, to operate the increasingly sophisticated base systems. A single remote controller may also be configured to operate (control and/or monitor) selectively base systems installed in two or more vehicles.

In many applications, the size of the remote controller is rather limited. For example, a remote controller of an automotive security system is typically carried by the operator of an automobile. Often, the operator carries the remote controller on a key chain, either in a pocket or in a purse. The remote controller, the key chain with a few keys, and possibly a wallet or pocket change are expected to fit comfortably in a garment pocket. A remote controller with a multitude of finger-operated keys hardly fits this requirement. For these and other reasons, the proliferation in the number of keys on the faces of remote controllers is unwelcome.

Commonly-owned U.S. Pat. No. 7,248,150 and U.S. Pat. No. 7,616,099 describe various attempts to reduce the number of keys of a remote controller, while preserving the ability to control or monitor a large number of functions of a controlled device, such as a base system of an automotive security system. The disclosures of the above-referenced patent documents are hereby incorporated by reference in their entireties as if fully set forth herein, including Figures, Tables, and Claims.

Information relevant to attempts to improve remote controls can also be found in U.S. Pat. Nos. 3,944,982; 3,949,297; 3,971,986; 3,988,701; 4,021,756; 4,041,394; 4,746,919; 4,890,108; 4,963,876; 5,038,401; 5,648,781; 5,712,638; 5,774,051; 6,127,941; 6,130,726; and 6,158,655.

One problem with certain remotely controlled automotive security systems arises when the remote controller is automatically locked to prevent operation or enabling/disabling of features of the base system through accidental depression of keys or accidental manipulation of other input devices of the remote controller. In some systems, the remote controller locks itself automatically, for example, after a period of inactivity, preventing activation of keys until it is unlocked through some action of its operator. This creates an inconvenience for the operator when the operator attempts to use the remote controller after automatic locking. A need exists in the art to eliminate or reduce instances of such inconvenience caused by the automatic remote controller locking feature.

Another problem with the automatic locking feature arises when the operator needs quickly to silence an alarm, which can be sounded or otherwise indicated when the operator attempts to unlock the automobile. A need exists in the art to enable quick silencing of alarms.

An automotive security system may include a number of sensors, such as glass-break, vibration, tilt, door/trunk/hood opening sensors, and proximity and contact sensors. In some environments, one or possibly more than one sensors or sensor groups can be susceptible to frequent false alarms. For example, a vibration sensor may cause a large number of false alarms when the automobile is parked on a busy street. The operator of the automobile may then be faced with the choice of suffering the consequences of frequent false alarms, or disabling the security system's sensors altogether. A need exists in the art to provide the user more control to remotely select individual system sensors for activation or deactivation while maintaining security to an automobile and avoiding the false alarms caused by a particularly sensitive sensor of the security system. A need also exists in the art to help the operator to identify quickly the offending (triggered) sensor or sensors that are causing the false alarms.

Automobiles may be parked in relatively insecure environments for prolonged periods of time. For example, people leave their automobiles in airport terminals for days and weeks at a time. An automobile's security system may be triggered—falsely or otherwise—numerous times during a single parking period. A need exists in the art to help the operator to determine the number, types, and timing of the alarms or similar security "events" upon the operator's return.

A need in the art also exists to help the operator to identify the specific source of an alarm without returning to the automobile. The operator can then make an educated guess regarding the probability of the alarm being a false alarm.

Some automotive security systems incorporate remote start capability, enabling an operator to start the automobile's engine using the system's remote controller. Remote start is particularly useful to heat or cool the vehicle cabin prior to entry in environments that may suffer extreme temperatures. See, for example, commonly-owned U.S. Pat. Nos. 6,781, 507, 6,828,901, and 7,248,150, the disclosures of which are hereby incorporated by reference in their entireties as if fully set forth herein, including Figures, Tables, and Claims. The remote start capability of an automobile may be terminated or disabled by a number of conditions, including various safety reasons or security-related events such as triggering of security sensors (glassbreak, vibration, proximity, tilt, door/hood/trunk). An operator who is unaware of the remote start being disabled may mistakenly rely on the remote start capability and be disappointed as a result. A need exists in the art to enable the operator of the automobile to find out whether the remote start capability was terminated or disabled, and if so, the reason it was terminated or disabled.

To enable the remote start capability of a manual transmission automobile, the operator of the automobile may first need to perform one or more operations or sequences of operations prior to engaging the system. For example, the operator may have to leave the automobile in neutral gear with the parking brake set, turn off the ignition switch then open and close the vehicle door while exiting the vehicle. The security system base unit with remote start feature receives inputs from the vehicle showing the sequence has been completed. This sequence is designed to establish that the passenger has put the manual transmission in neutral and then set the break and exited the vehicle in a natural manner. Unless the owner performs the required act(s) or sequence(s), the remote start will be disabled so that the vehicle does not lunge forward if the transmission is left in gear while attempting to remote start. The owner may be inconvenienced upon his or her return to find that the remote start did not function as expected. A need exists in the art to help the operator avoid such inconvenience.

It may be desirable to start an automobile's engine remotely in automatic manner. For example, an operator may want to start the automobile at a predetermined time, or a predetermined time interval following locking of the automobile and/or arming the automobile's security system, in order to warm up the automobile's engine and prevent freezing of the coolant. Similarly, the operator may want to keep the temperature in the passenger compartment within a reasonable range, and therefore automatically start the engine and the air conditioning system periodically. (This may be particularly useful if a pet is left in the automobile.) A need exists in the art to enable the operator (i.e., the end-user, as opposed to the installer/programmer of the security system or a similar professional) to set such automatic starts based on various environmental parameters or other criteria, including one or more vehicle states or parameters. A need also exists in the art to enable the operator (again, the end-user) to set or vary engine run time following automatic starts. A need exists in the art to enable the operator to remotely access information regarding the time remaining until the next automatic remote start, remaining engine run time following an automatic start, and/or the state of one or more selected and monitored parameters, such as the parameter(s) activating the remote start—for example, passenger compartment temperature, engine coolant temperature, fuel level and/or electrical system voltage.

After an operator parks an automobile next to a parking meter and leave the proximity of the meter, the operator may forget when he or she last inserted money into the parking meter, and the amount of inserted money. The operator may also forget to move the automobile or to insert additional coins into the parking meter prior to expiration of the parking meter. A need exists in the art to provide means for the operator to monitor the time remaining on the parking meter, and to receive a warning when or shortly before the parking meter expires.

Some remote controllers can be configured to operate two or more automobiles. This might be the case in a single household with several automobiles. The operator may get confused regarding which vehicle the remote controller is configured to operate at a given time. For example, the operator may accidentally switch the remote controller to another automobile, or intentionally switch and then forget about the switch to the other automobile. A need exists in the art to clear up such confusion promptly by providing the user notice regarding the pairing of the remote control to a specific vehicle.

Whenever an operator of the automobile attempts to activate a function of the base system remotely, the operator may not be in a position to observe and confirm that the desired function was in fact activated. For example, an adult operator may send a minor to fetch something from a locked automobile parked outside or in a garage. The operator may want to unlock the automobile and disarm the automobile's security system to allow the minor to open the automobile's door or trunk. The unlocking and disarming commands, however, may not be received by the base system, causing a false alarm and necessitating a second trip to the automobile. There is a need in the art to reduce or eliminate instances of such inconveniences.

The present invention is directed to apparatus, methods, and articles of manufacture that satisfy one or more of the above-mentioned and/or other needs.

DETAILED DESCRIPTION

Figure 1:
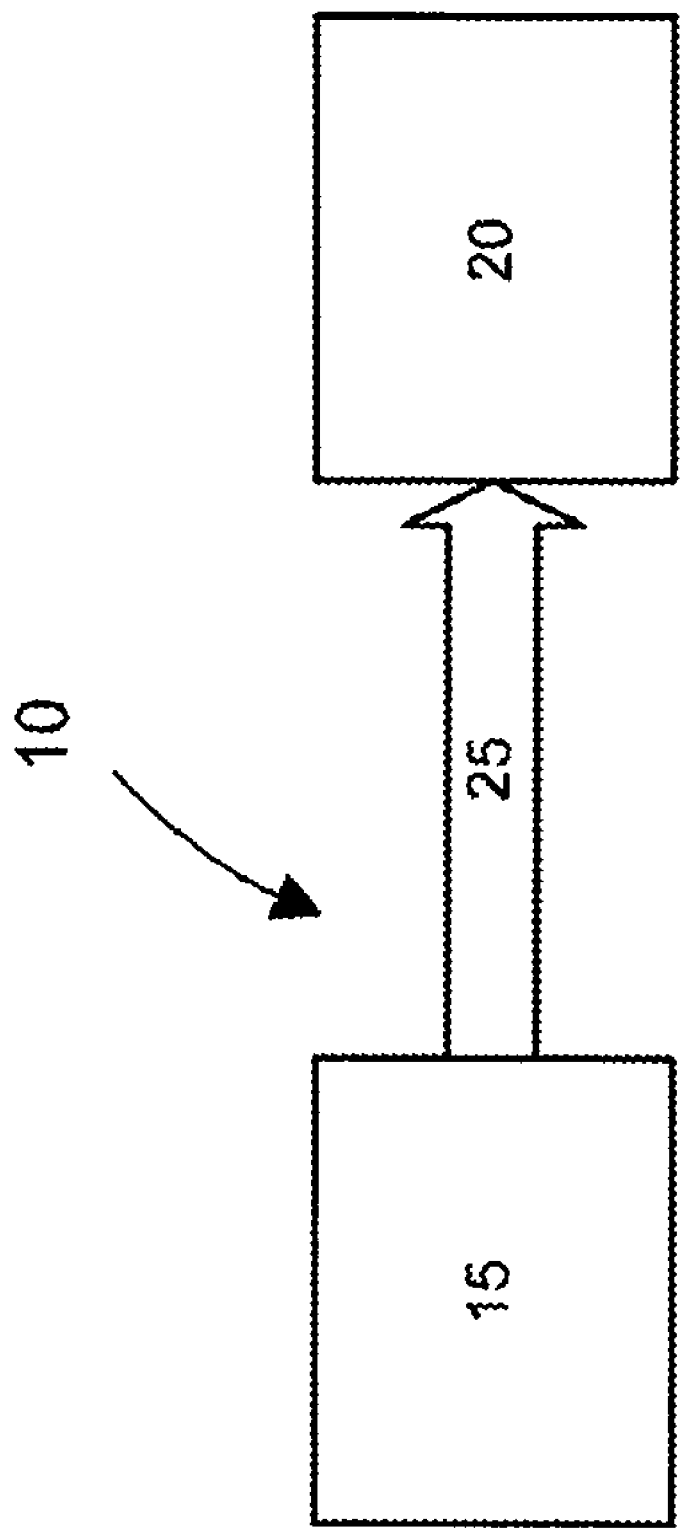
FIG. 1 is a simplified schematic diagram of a generalized remote control system in accordance with embodiments of the present invention.

Reference will now be made in detail to several embodiments of the invention that are illustrated in the accompanying drawings. Same or similar reference numerals may be used in the drawings and the description to refer to the same or like parts. The drawings are in simplified form and are not to precise scale. For purposes of convenience and clarity only, directional terms, such as top, bottom, left, right, up, down, over, above, below, beneath, rear, back, and front, may be used with respect to the accompanying drawings. These and similar directional terms should not be construed to limit the scope of the invention in any manner. In addition, the expressions remote control, remote controller, and remote control device are used interchangeably to indicate a wireless device configured to control and/or obtain information from a base system of a vehicular security system. The base system is the portion of the security system installed or installable in a vehicle. The base system may be integrated into a vehicle data bus system or micro-controllers attached to the data bus and capable of sending and receiving control messages over a vehicle data bus system.

Several references are made to operator selectable or programmable values, selections, and flags. Such values/selections/flags are typically stored in non-volatile memory or memory with power backup, such as EEPROMs and battery-backed memory. The operator may select or program the values through a menu driven process. No special equipment or skill is needed for the programming of the values/selections/flags, so that the task need not require a professional installer's help.

The word "variant" may be used interchangeably with the word "embodiment," or it may be used to designate a variation of a specific embodiment.

Referring more particularly to the drawings, FIG. 1 is a simplified schematic diagram of a generalized remote control system 10. The system 10 includes a base system 20 and a remote controller 15, connected by a link 25. The link 25 can be a wireless link, such as an IR, ultrasound, or RF link. In some embodiments, the link 25 or a portion of the link 25 is implemented through WiFi. The link 25 may but need not be a direct link. In embodiments and variants, the link is implemented through a satellite connection, cellular telephone network connection, or another connection, using one or more intermediate points and two or more sub-links. The sub-links can be of the same kind (all RF, all satellite, all cellular, for example); the sub-links can also be different (one a WiFi link, another a cellular link, for example). Although the arrow representing the link 25 is unidirectional, pointing from the remote controller 15 to the base system 20, in practice, the link can be bi-directional, carrying data in the reverse direction as well. The data carried in the reverse direction, i.e., from the base system 20 to the remote controller 15, can include, for example, alarm data, status data, alive and well messages, clock synchronization signals, diagnostic data, warning data, conformation data, and any other data useful to the user. The description below lists selected examples of the data that can be sent by the base system to the remote controller.

Figure 2:
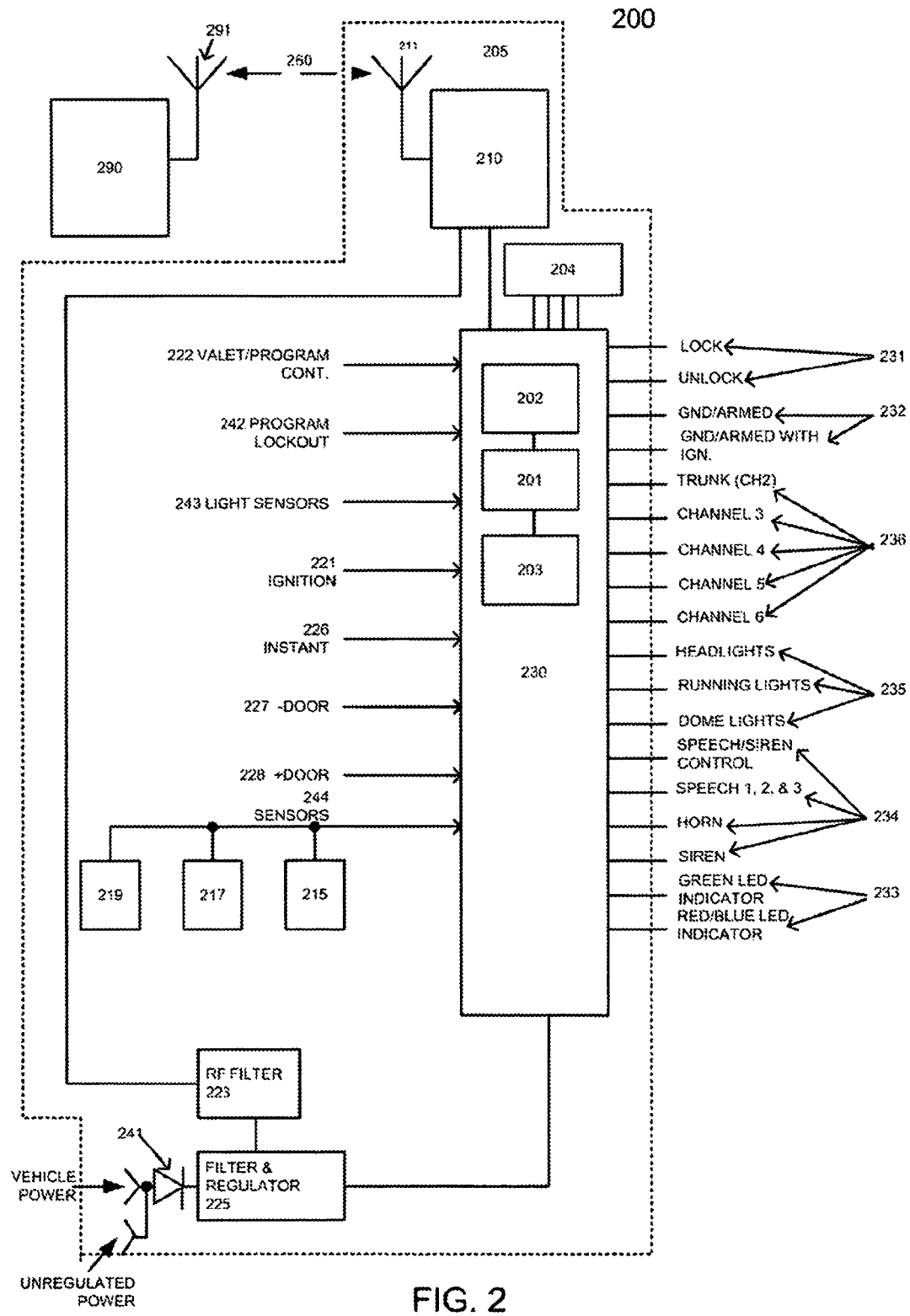
FIG. 2 is a simplified schematic diagram of a remote control automotive security system in accordance with embodiments of the present invention.

FIG. 2 is a simplified schematic diagram of a remote control system configuration of an advanced vehicle security system 200. As illustrated, the system is includes of a remote controller 290 with its associated antenna 291, a wireless link 260, and a base system 205 (drawn within the dotted lines) that has the remaining components shown in FIG. 2. The remote controller 290 can be a controller used to operate the base system 205, or a remote programmer, for example, a programmer such as described in the U.S. Pat. No. 6,700,479, used to program and configure the base system 205. Some embodiments of the remote controller 290 can perform both tasks, i.e., remote programming and remote control.

The base system 205 includes a base controller 230; a base transceiver 210 with its antenna 211; power supply components 225, 223, and 241; sensors 215, 217, and 219; and various additional inputs and outputs. The base controller 230 includes a processing unit 201, a non-volatile instruction memory 202, and operation memory 203. In the described embodiment, the base controller 230 is implemented as a microprocessor 201 with internal memory modules 202 (ROM) and 203 (RAM). As illustrated in FIG. 2, an external non-volatile memory device 204, such as an electrically erasable programmable read-only memory (EEPROM), can supplement the microprocessor memory, storing, for example, field-configurable control data remote controller codes, and values/selections/flags selectable by the operator of the system 200.

The base transceiver 210 communicates with the remote controller 290 over the link 260. Thus, the base controller 230, which is coupled to the transceiver 210, can communicate with the remote controller 290 through the base transceiver 210 and the link 260. Although in the described embodiment the link 260 is shown as a bi-directional link, in some alternative embodiments the link 260 is unidirectional, carrying commands from the remote controller 290 to the base controller 230, but not in the opposite direction; in such embodiments, a simple receiver can perform the necessary functions in place of the transceiver 210. The link 260 may be the link 25 described above.

The power subsystem includes a protection diode 241 that isolates the vehicle's power system from the base system 205, a filtering and regulating module 225 that produces a clean power supply voltage for the base system 205, and a filter 223 for keeping the high frequency voltage variations produced by the transceiver 210 from affecting the rest of the base system 205.

The sensors of the described device 205 include a shock or vibration sensor 215, a field disturbance sensor 217, and a glass break sensor 219. Any other sensors appropriate to an automotive security system (or another installed environment) can be included as well.

Among the additional inputs to the base system 205 are these: +/−door inputs 228 and 227; a light sensor input 243; a valet/program control switch input 222; an ignition input 221; and a program lockout input 242, intended to prevent both accidental and intentional (subversive) programming of the base system 205, and programming of the remote controller 290 through the base system 205.

Lines 231 through 236 provide the following signal and control outputs:

Power door lock and unlock outputs—231;

Ground when armed and ground when armed-plus-ignition outputs for starter interrupt—232;

LED indicator outputs—233;

Speech, horn, and siren outputs for audible alarms and warnings—234;

Headlights, running lights, and dome light outputs—235; and

Channels 2 (trunk), 3, 4, 5, and 6 auxiliary outputs—236.

In a variant of the remote control system embodiment illustrated in FIG. 2, the base system includes remote start capability that uses additional inputs and outputs to enable the base system to start the vehicle. In this variant, the base system 205 includes inputs for a tachometer, neutral sense, brake, hood (this can be an input to the security section of the system), and remote start activation. Some of the added outputs are as follows: a starter output; ignition output(s); and accessory output(s) for controlling the heater, air conditioner or any other vehicle function.

Figure 3:
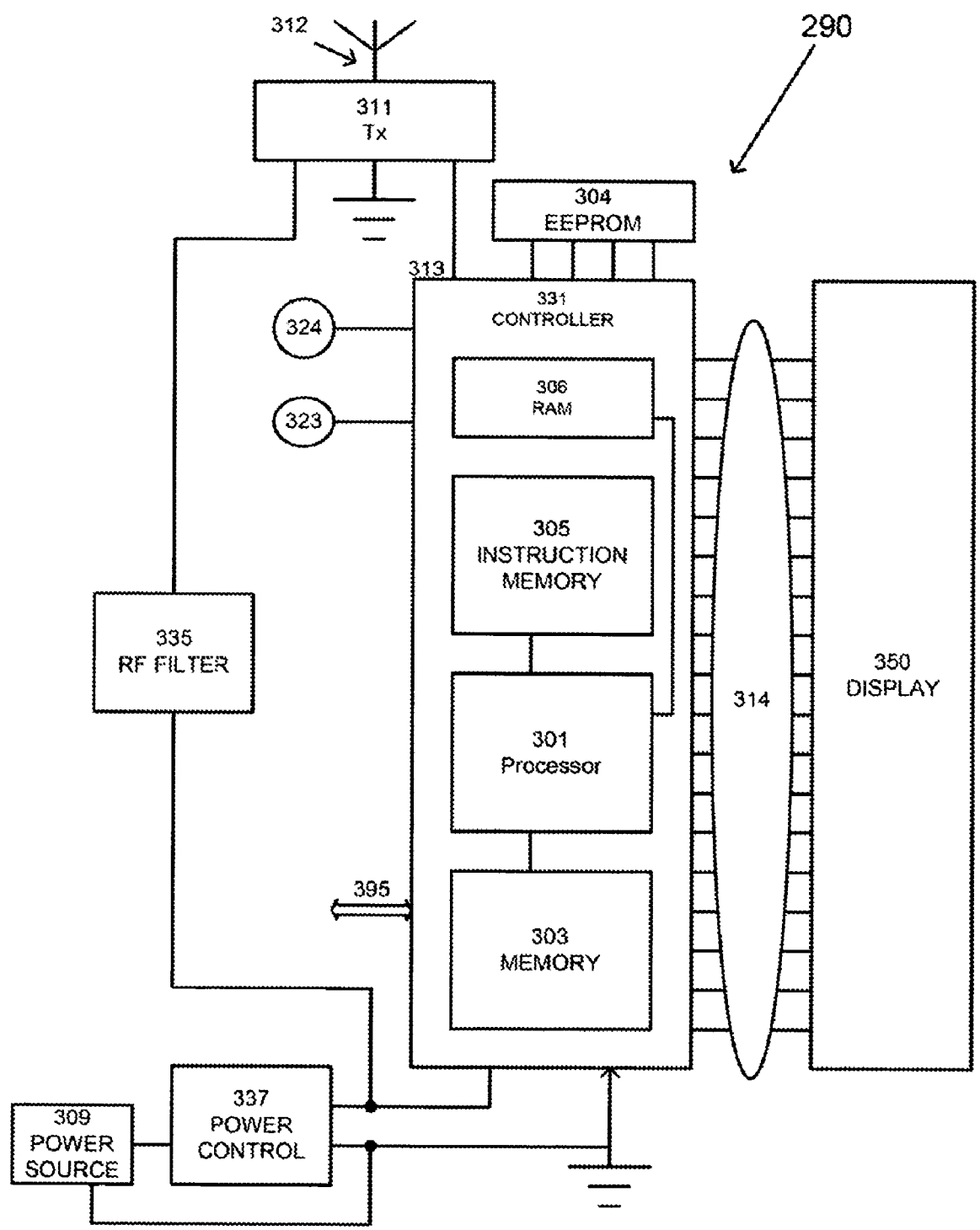
FIG. 3 is a simplified schematic diagram of a remote controller in accordance with embodiments of the present invention.

FIG. 3 illustrates a simplified block diagram of a variant of the remote controller 290 built on the platform of a controller 331, which can be, for example, a microcontroller (MCU), a microprocessor, or an application-specific circuit. In the specific variant of FIG. 3, the controller 331 is a microcontroller. It includes a processing unit 301; random access memory 306 for use as operating registers, address registers, and for other data storing functions during program execution; and memory modules 303 and 305 for storing program instructions and data. The memory modules 303 and 305 can include, for example, read only memories (ROMs), programmable ROMs (PROMs), electrically programmable ROMs (EPROMs), and electrically erasable PROMs (EEPROMS). The memory module 305 is typically used to store program instructions and constants. In the embodiment of FIG. 3, the memory module 303 is a non-volatile, re-writable memory module, such as Flash, EEPROM, or low-power battery-backed memory. It is used to store programmable control and configuration data, such as icon definitions and menu lists, for the functional routines of the remote controller 290.

Numeral 395 designates a port through which the remote controller 290 can receive its own operating software and configuration parameters. In the embodiment of FIG. 3, the port 395 is a custom serial data port. In other embodiments, the port can be implemented, for example, as a Universal Serial Bus (USB), an RS 232 serial port; as a parallel port; as a wired or wireless (e.g., IR, RF, ultrasound) network connection to the WAN (Internet), LAN, intranet, or extranet; as a memory storage reader device; or as a receiver, transceiver, modem, or another communication interface device.

Using the port 395, a user of the remote controller 290 can download new icons from, for example, a personal computer, a personal digital assistant (PDA), or a network, either directly or through an intermediary mechanism. One variant of the remote controller 290 receives complete software updates through the port 395. In another variant, the remote controller 290 is programmed, through the port 395, to operate additional one or more base systems. Thus, when the base system 205 is retrofitted with new components operable or configurable by the base system 205, the controller 290 can receive software and/or configuration parameters patch to enable it to control the new components through the base system 205.

In one particular embodiment, the controller 290 receives, through the port 395, software and/or configuration data that allow the user to configure remotely an audio amplifier installed in a vehicle with a security system operable by the controller 290. In another embodiment, the controller 290 receives software and/or configuration parameters that allow the user to employ the controller 290 as a remote control for a video entertainment system connected to a vehicle security system operable by the remote controller 290. In yet another embodiment, the controller 290 receives software and/or configuration data that allow the user to configure and operate, through the controller 290, a vehicle locator and a Global Positioning System connected to the vehicle security system operable by the controller 290.

The controller 331 also has an input-output (I/O) section that provides the controller 331 with the capability to read inputs and drive outputs under program control. The inputs of the I/O section of the controller 331 include connections to a scroll switch 324 and to a selection switch 323. The outputs of the I/O section include the outputs 314 for driving a display 350. Input/ouput lines 313 are used to activate and send data to remote controller 290 transmitter/transceiver and lines to interface with external non-volatile memory 304 (EEPROM).

The display 350 is part of the user interface of the remote controller 290. It can be a graphical or an alphanumeric display. In this particular embodiment, the display 350 is a dot matrix liquid crystal display (LCD). In another embodiment, the display 350 is a fixed-icon LCD. The remote controller 290 may be configured to display animation, such as door opening, trunk opening, hood opening, glass breaking, engine running (e.g., vibrating), cold/hot (blue/red) air blowing, and others.

The transceiver 311 can accept any data for transmission to the transceiver 210 of FIG. 2. As mentioned previously, the link 260, over which the transmitter 290 and the transceiver 210 communicate, can be an RF, IR, ultrasound, or another kind of link. The nature of the link 260 dictates the specifics of the transceiver 311 and the transceiver 210. In one possible embodiment, the link 260 is implemented as a Bluetooth link, and thus the transceiver 311 and the transceiver 210 are Bluetooth-compliant components.

The selection/activation and scroll switches 323 and 324 are also part of the graphical user interface of the remote controller 290. The scroll switch 324 can be any mechanism capable of directing the controller 331 to advance the display 350 from one menu item to another. In particular, the scroll switch 324 can be (1) a push-button switch; (2) a toggle switch, momentary or not; and (3) a rocker switch, momentary or not. Other types of switches that can be used to scroll through a menu, such as up-down and left-right switches, are also used as the scroll switch 324 in embodiments. Moreover, the scroll switch 324 is not limited to being a "switch": it can be a scroll wheel, roller ball, eraser head, joystick, steering lever, key control, pocket PC mouse, or a touch screen with stylus pen input device.

The selection switch 323 can be a user operable standalone switch chosen among the kinds of switches listed above in connection with the scroll switch 324. But the selection switch 323 can also be built into most, and probably all, of the scrolling devices, including these: scroll wheels, roller balls, eraser heads, joysticks, steering levers, key controls, and touch screens. Indeed, the selection switch 323 and the scroll switch 324 can be integrated in a single device, as was done in the embodiments illustrated in U.S. Pat. No. 7,248,150 and U.S. patent application Ser. No. 11/762,235. In these embodiments, the scroll/selection switch assembly has a scroll wheel with an internal push-to-activate switch. The scroll wheel can be rotated in either direction to scroll through the menu items displayed on the display 350. When the user reaches the menu item corresponding to the function that the user wishes to activate, the user pushes down on the scroll wheel, changing the state of the internal push-to-activate switch. The controller 331 senses the change in the state of the internal switch, and sends a command to the base system 205 to operate an internal function or to send commands through the transceivers 311 and 210, and the link 260. The command corresponds to the desired function, which the base system 205 performs when it receives the command.

For convenience in everyday use, the scroll/selection assembly can provide tactile and audible feedback to the user: the scroll wheel can click when it is rotated, with each click corresponding to advancement of the displayed menu to the next item; and the internal push-to-activate switch can click when it is depressed. The feedback can also be generated by other outputs of the remote control. For example, a change in the display, LED flashes, or a speaker or a buzzer can generate the audible feedback.

In one embodiment, the pressure needed to activate the internal switch is between about 1 and 6 times the pressure that a typical user needs to apply in order to rotate the scroll switch with a fingertip. In another embodiment, the pressure needed to activate the internal switch is between about 0.15 and 0.75 ounces.

Electrical power for the operation of the remote controller 290 comes from the power source 309. In the illustrated embodiment, the power source 309 is a primary or secondary (rechargeable) battery. Alternative power sources include any portable sources of power, such as fuel cells, solar cells, capacitors (including double layer capacitors), and mechanical generators, hand- or otherwise-operated. Power conditioning circuit 337 is not required for most applications, but will be disclosed to cover applications where it may be useful. The power conditioning circuit 337 smoothes and regulates the voltage of the power source 309. Here, the power conditioning circuit 337 is a combination of a filter and a regulator. The filter portion of the circuit 337 can include capacitors, inductors, and resistors, while regulation is performed by a regulator, such as a buck, boost, or charge-pump regulator. In other embodiments, the circuit 337 can be built with a power supply supervisor chip that cuts the power to other components of the remote controller 290 when the supply voltage drops below a predefined threshold. Numeral 335 denotes an RF filter that isolates the transmitter/transceiver 311 from the power inputs of the remaining components of the remote controller 290. Filter 335 can be connected before or after the power conditioning circuit 337, and will be connected after power conditioning circuit 337 if power conditioning circuit 337 includes a boost or charge-pump regulator.

Figure 4:
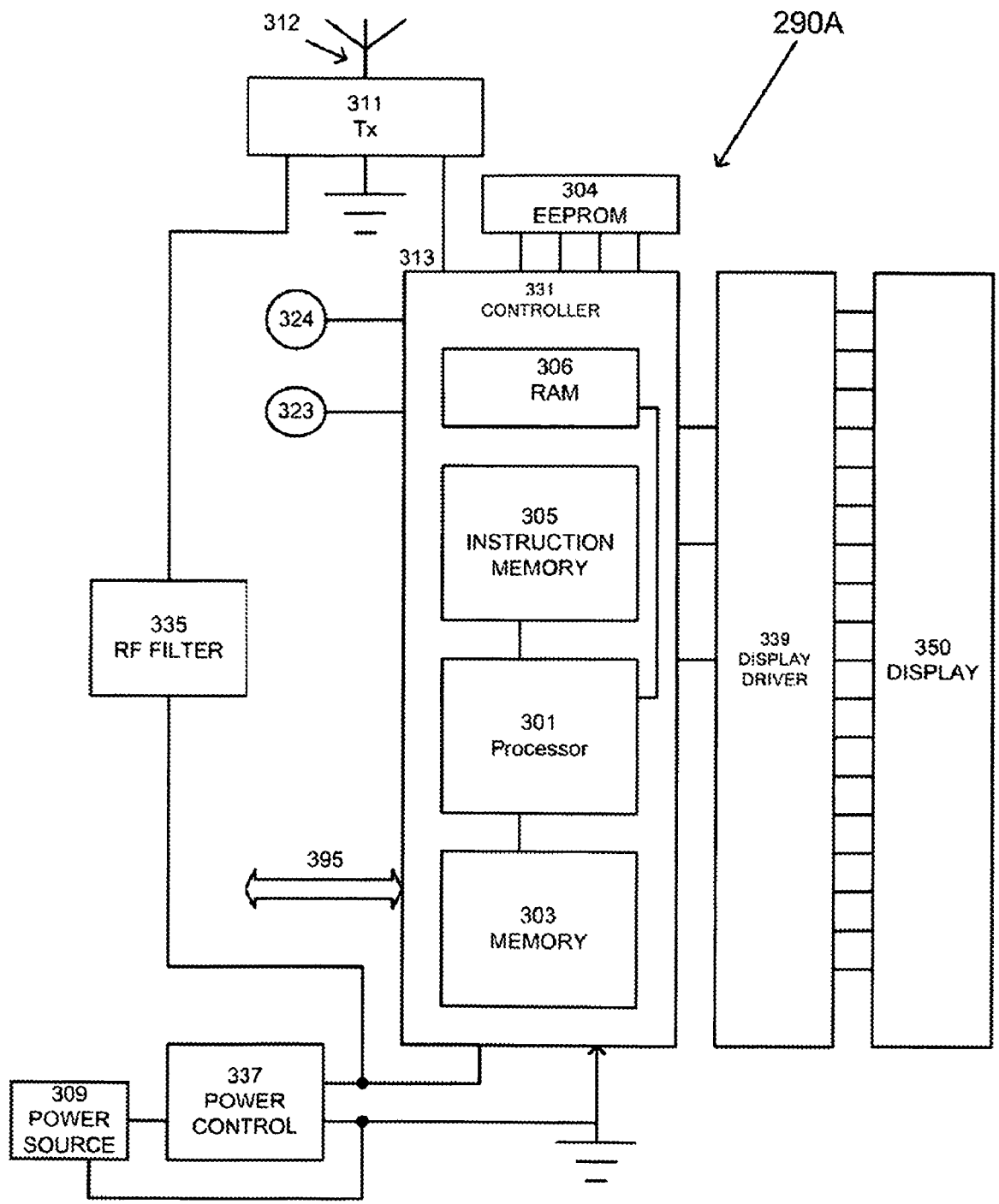
FIG. 4 is a simplified schematic diagram of a remote controller that includes a display driver, in accordance with embodiments of the present invention.

FIG. 4 depicts an embodiment of a remote controller 290A that is similar to the remote controller 290 of FIG. 3. Most of the elements of the remote controller 290A illustrated in FIG. 4 are similar or identical to the elements of the remote controller 290 of FIG. 3. One difference between the two embodiments lies in the interface between the controller 331 and the display 350. In the remote controller 290, the controller 331 drives the display 350 directly; in the remote controller 290A, a display driver 339 is interposed between the controller 331 and the display 350. Thus, in the embodiment of FIG. 4, the controller 331 provides display data to the display driver 339, which in turn drives the display 350. This architecture frees up output driver(s) of the controller 331, allowing the use of a smaller device.

FIGS. 5 through 8 are high-level flowcharts of selected steps and decision blocks of selected processes performed by (1) a remote controller of an automotive security system, such as the remote controller 290 described above, and (2) a base system, such as the base system 205 described above. Note that the user inputs to which the remote controller responds in the course of performing the steps of the flowcharts may be manual inputs, made through, for example, keys of a keypad, a scroll wheel with a push-to-activate internal switch, or another kind of manual input device. The manual inputs can also be performed with two or more scroll switches—for example, scroll up, scroll down, scroll right, and scroll left switches—plus an activation/selection switch. The remote controller can also provide audible and visual outputs to its operator. The remote controller may be made and configured as is described in the commonly-owned U.S. Pat. Nos. 7,248,150 and 7,616,099.

Figure 5:
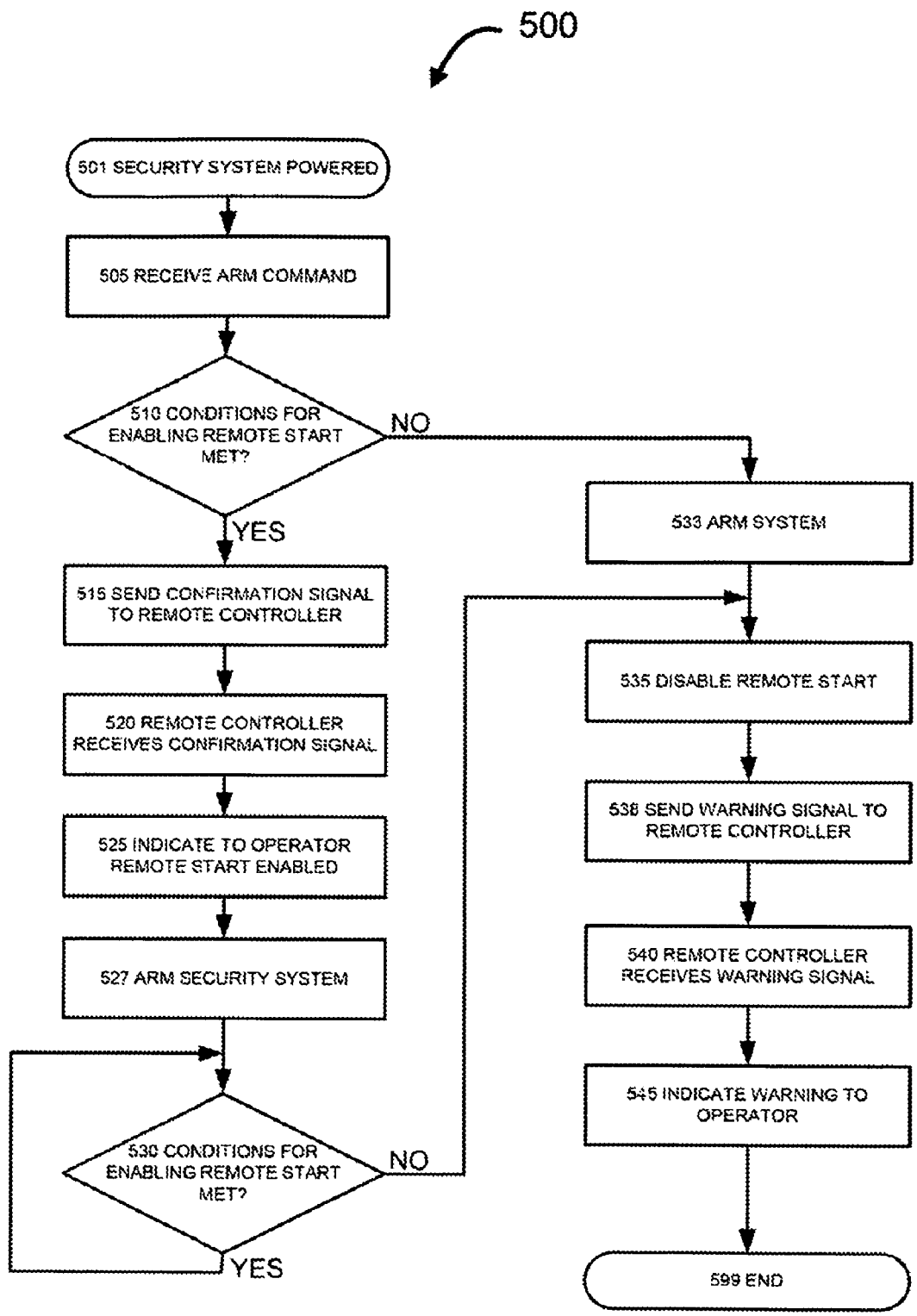
FIGS. 5-8 illustrate high-level flowcharts of some of the steps performed by a vehicular security system with remote start capability.

FIG. 5 shows selected steps and decision blocks of a process 500 performed by a remote controller and a base system of an automotive security system configured for remote start. At flow point 501, the security system is active with both the remote controller and the base system powered up. At step 505, the security system receives an arm command from its operator; the operator may enter the arm command through the base system console or through the remote controller.

At decision block 510, the base system determines whether the one or more conditions required for remote start have been met. Some conditions for enabling remote start and the techniques for determining whether the conditions have been met are described in a commonly-owned U.S. Pat. No. 7,532,959, which is hereby incorporated by reference in its entirety as if fully set forth herein, including Figures, Tables, and Claims. For example, a manual transmission automobile may need to be left with its driving gears disengaged (i.e., in neutral gear), and with the parking brake set.

If the conditions have not been met, process flow proceeds to step 533 where the system is armed, if possible. (Some of the conditions preventing remote start may also prevent arming of the system.)

From the step 533, process flow proceeds to steps 535, 538, 540, and 545, which will be described further below, and terminates at flow point 599.

If the conditions have been met, as determined in the decision block 510, process flow proceeds to step 515 where the base system sends a confirmation signal to the remote controller indicating that the remote start capability is available. Steps 520, 525, and 527 follow the step 515. In the step 520, the remote controller receives the confirmation signal. In the step 525, the remote controller indicates that the remote start capability is enabled. For example, the remote controller renders a visual graphic, text, and/or animation, and/or sounds an audio indication, such as a chirp. In the step 527, the base system arms itself (as in the step 533). The steps 527 and 533 may be replaced with a single step of arming the system, performed between the step 505 and the decision block 510.

From the step 527, process flow continues to decision block 530, which can be identical or similar to the decision block 510. If the conditions continue to be met, the process flow loops back to the input of the decision block 530. Otherwise, process flow continues to step 535 to disable remote start capability. With the remote start capability disabled, the security system will not start the engine remotely, either in response to a command received from the remote controller, nor automatically based on preselected parameters such as time, passenger compartment temperature, engine (coolant) temperature, and battery voltage. The security system then sends a warning signal from the base system to the remote controller, in the step 538. The remote controller receives the warning signal in step the 540, and, in the step 545 indicates to the operator a corresponding warning in response to the warning signal. For example, the remote controller may sound an audio warning, or display a graphic, a textual message, and/or animation advising the operator that the remote start capability is disabled. The process 500 then terminates at the flow point 599.

Turning next to the details of the decision blocks 510 and/or 530, the base system checks its appropriate sensors to determine whether the conditions are met. For example, the base system determines whether a security breach has occurred, such as an opened door; opened hood; opened trunk; triggered glassbreak sensor; triggered proximity sensor (field disturbance sensor, for example); and/or triggered vibration sensor. The specific parameters and their values for automatic remote start can be selected by the operator (not just the installer) of the security system, and then stored by the system in programmable/erasable non-volatile memory such as EEPROM and battery backed RAM. In a manual transmission equipped automobile, the base system may determine whether the automobile is in neutral gear (i.e., determine whether all forward and reverse gears are disengaged), and whether parking brake has been set. These are illustrative, non-exclusive examples.

Figure 6:
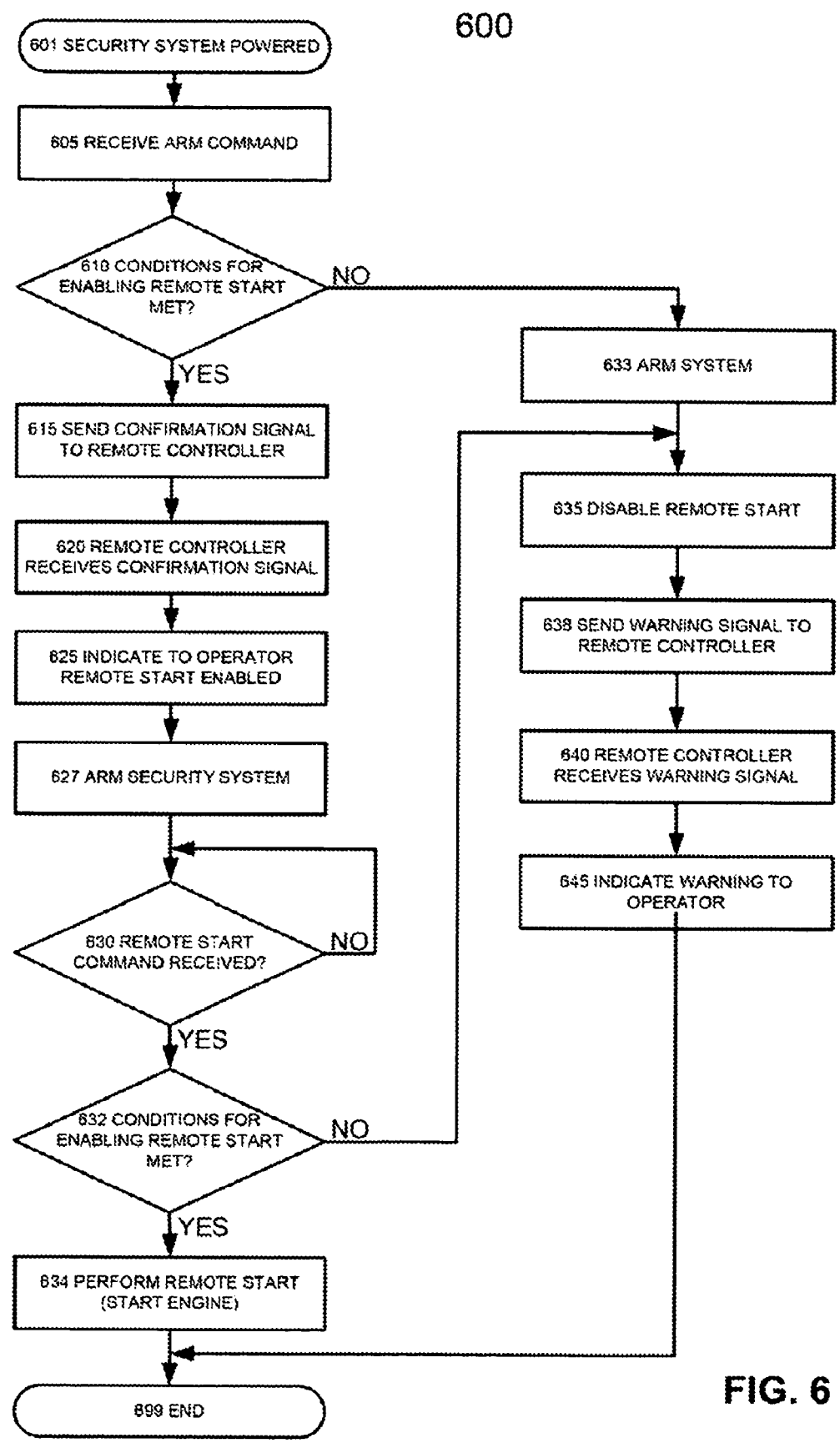

FIG. 6 shows selected steps and decision blocks of another process 600 performed by a remote controller and a base system of a security system configured for remote start. The process 600 is similar to the process 500. Here, however, the base system determines whether the conditions for remote start have been met at the time the system is armed, and then at the time when remote start is activated.

At flow point 601, the security system is active with both the remote controller and the base system powered up. At step 605, the security system receives an arm command from its operator; the security system may receive the arm command through the base system or through the remote controller. At decision block 610, the base system determines whether the one or more (e.g., all) conditions required for remote start have been met. If the conditions have not been met, process flow proceeds to step 633, to arm the security system, and then continues to steps 635, 638, 640, and 645, described below.

If the conditions have been met, as determined in the decision block 610, process flow proceeds to step 615 where the base system sends a confirmation signal to the remote controller indicating that the remote start capability is available. Steps 620, 625, and 627 follow the step 615. In the step 620, the remote controller receives the confirmation signal. In the step 625, the remote controller indicates that the remote start capability is enabled. For example, the remote controller renders a visual graphic, text, and/or animation; and/or sounds an audio indication, such as a chirp. In the step 627, the base system arms itself (as in the step 633). The steps and decision block 605, 610, 615, 620, 625, 627, 633, 635, 638, 640, and 645 may be identical or analogous to the similarly-numbered (except for the first digit) steps and decision block 505, 510, 515, 520, 525, 527, 533, 535, 538, 540, and 545 of the process 500. The steps 627 and 633 may be replaced with a single step of arming the system, performed between the step 605 and the decision block 610.

From the step 627, the base system proceeds to loop periodically through decision block 630 until it receives a remote start command. (As a person skilled in the art would understand after perusal of this document, the loop through the decision block 630 may terminate otherwise, for example, through receipt of a disarm or another command.) The remote start command may be received from the remote controller of the security system, or may be originated automatically based on one or several parameters, for example, time, passenger compartment temperature, engine temperature, and battery voltage.

When the test in the decision block 630 indicates that a remote start command has been received, the process flow continues to decision block 632 to determine whether the conditions for enabling remote start are met. This test may be identical or analogous to the test in decision block 610.

If the conditions continue to be met, as determined in the decision block 632, remote start is performed in step 634 and process flow terminates at flow point 699. Otherwise, process flow continues to the step 635 to disable remote start capability. With the remote start capability disabled, the security system will not start the engine remotely, either in response to a command received from the remote controller nor automatically based on preselected parameters such as time, passenger compartment temperature, engine temperature, an electrical system voltage. The security system then sends a warning signal from the base system to the remote controller, in the step 638. The remote controller receives the warning signal in the step 640, and, in the step 645, indicates a corresponding warning in response to the warning signal. For example, the remote controller may sound an audio warning, or display a graphic, a textual message, and/or animation advising the operator that the remote capability is disabled. The process 600 then terminates in the flow point 699.

In a variant of the process shown in FIG. 6, the security system continually (e.g., periodically) checks for the conditions for enabling remote start after remote start is disabled in the step 635. If the conditions are met, the remote start is enabled. This variant can be implemented, for example, by the process flow advancing from the step 645 to a new decision block such as the decision block 610 and/or 632. If the conditions are not met, as determined in this new decision block, the process flow loops back to the input of the new decision block; if the conditions are met, as determined in the new decision block, the process flow continue to the input of the decision block 630, optionally sending a notification to the operator at the remote controller.

Figure 7:
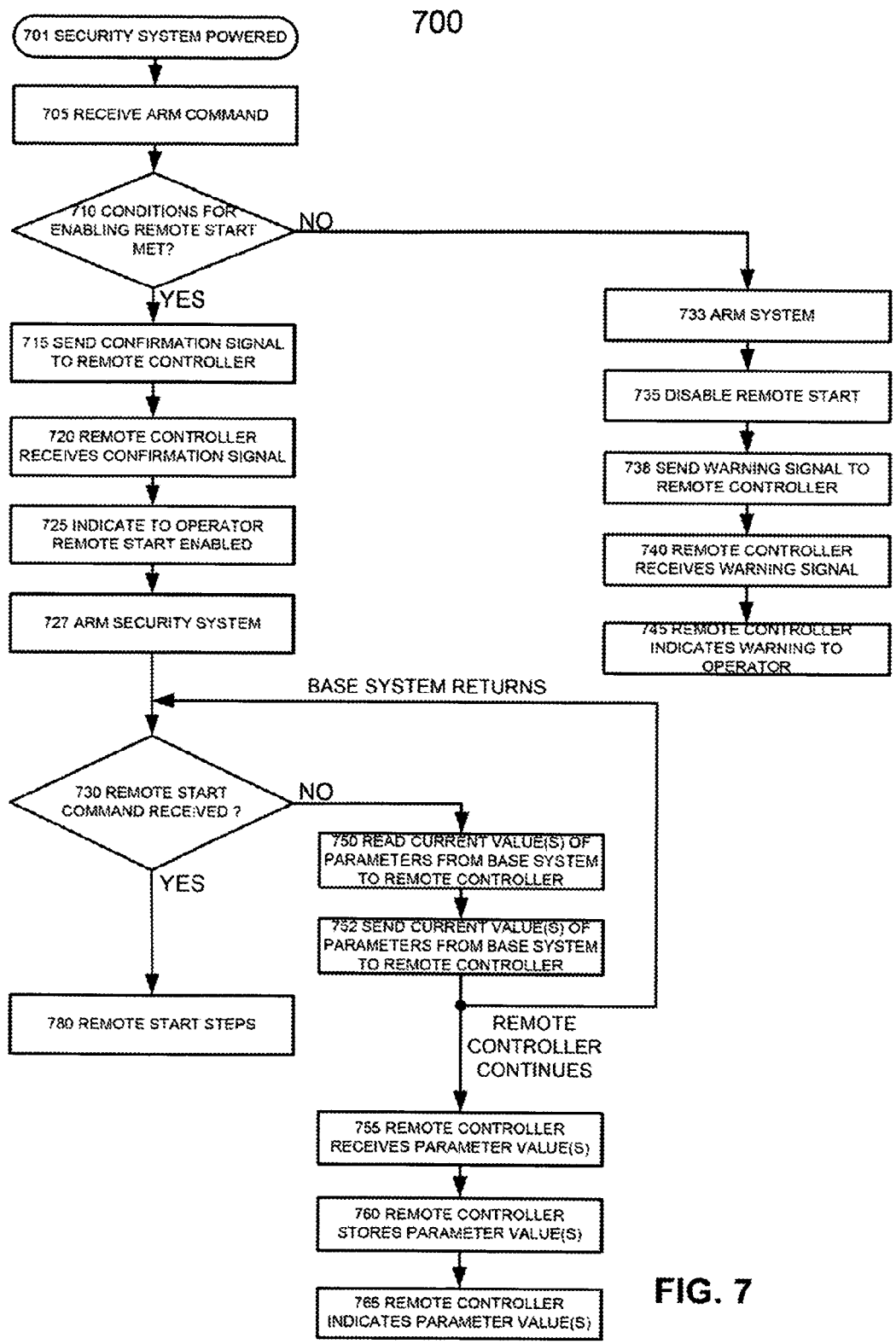

FIG. 7 shows selected steps and decision blocks of yet another process 700 performed by a base system and a remote controller of a security system configured for remote start of an automobile. The security system is configured for automatic start based on one or more parameters, such as time (actual or expiration of a timer), temperature (of engine, passenger compartment), battery voltage, and/or one or more other parameters.

At flow point 701, the security system is active with both the remote controller and the base system powered up. At step 705, the security system receives an arm command from its operator; the security system may receive the arm command through the base system console or through the remote controller. At decision block 710, the base system determines whether the one or more conditions required for remote start have been met.

If the conditions have not been met, process flow proceeds to step 733, to arm the security system. From the step 733, process flow proceeds to step 735 to disable remote start, and to step 738 in which the base system sends a warning signal notifying the remote controller that remote start is disabled. Following the step 738, the remote controller receives the warning in step 740, and indicates (e.g., displays, sounds) the warning to the operator, in step 745. (Here and elsewhere, the remote controller may simply store the warning to enable the operator to receive an indication of a warning or a confirmation at a later time.)

If the conditions have been met, as determined in the decision block 710, process flow proceeds to step 715 where the base system sends a confirmation signal to the remote controller, indicating that the remote start capability is available. In step 720, the remote controller receives the confirmation signal. In step 725, the remote controller indicates that the remote start capability is enabled. For example, the remote controller renders a visual graphic/text/animation, and/or sounds an audio indication, such as a chirp. In the step 727, the base system arms itself (as in the step 733). The steps and decision block 705, 710, 715, 720, 725, 727, 733, 735, 738, 740, and 745 may be identical or analogous to the similarly-numbered (except for the first digit) steps and decision block 505, 510, 515, 520, 525, 527, 533, 535, 538, 540, 545 of the process 500. The steps 727 and 733 may be replaced with a single step of arming the system, performed between the step 705 and the decision block 710.

From the step 727, the base system proceeds to decision block 730 to determine if a remote start command has been received (from the remote controller or from another process capable of triggering automatic remote start of the automobile's engine). If the command has been received, the system proceeds to step(s) and/or decision block(s) generally designated as 780, such as the steps/blocks 632/634 of the process 600 of FIG. 6. If the command has not been received, process flow advances to step 750 to read the one or more parameter values controlling automatic remote start. This step may include, for example, reading the time remaining until the next automatic remote start, the electrical system voltage, the passenger compartment temperature, and/or the engine temperature. The values may be read directly from sensors (e.g., timer, voltage sensor, temperature sensor) in real time or substantially in real time; the values may also be read from memory locations where they were most recently stored, for example, within a minute or 30 seconds of the time they are read in the step 750. The base system then sends the values of the one or more parameters to the remote controller, in step 752. For the base system, process flow then returns to the decision block 730; for the remote controller, process flow continues to steps 755, 760, and 765, in which the remote controller receives, stores, and indicates to the operator the received parameter values, respectively. The indication in the step 765 may be performed automatically, or in response to a command by the operator of the remote controller. As in other steps, the indication may be visual (graphic/text/animation) and/or audible.

A security system may be configured to send one or more parameters of the automobile and/or of the base system to the remote controller, for display or another indication to the operator. The parameters may be those triggering automatic remote start, or other parameters. The security system may send the parameters periodically (as is done in the process 700), or upon request of the operator initiated through the remote controller. The parameters may be sent during engine operation following an automatic remote start. For example, the base system can be configured to send to the remote controller the remaining engine run time (i.e., the time remaining until the engine is automatically shut off following a remote start), the engine temperature, the passenger compartment temperature, and/or other parameters. The remote controller may be configured to display the value(s) of the received parameter(s) to the operator, either automatically or in response to the operator's request. The base system may send the parameter updates periodically, at predetermined times, at predetermined milestones of one or more parameters (e.g., every minute, every degree Celsius or Fahrenheit), and/or in response to a request from the remote controller. The system may allow the operator (instead of or in addition to the installer) to select frequency of such updates, the specific milestones of the updates, or the specific times of the updates. The system may be configured to allow the operator to make the selections through a menu-driven process, either from a console of the base system, or through the remote controller.

The remote controller of a security system may be programmed by the operator to provide an indication of time remaining until an event, such as expiration of time on a parking meter. The operator may pay for some parking time, and substantially contemporaneously set a timer on the remote controller, to be able to see the remaining time on the parking meter. The remote controller may be configured to give a "pre-warning," i.e., an indication that the parking time is about to expire provided some predetermined time (say one or five minutes) before the expected expiration of the time on the parking meter. The remote controller may be configured to enable the operator to input the time remaining on the parking meter through a menu showing various coins and their correspondence to different time intervals. For example, the remote controller may be programmed by the operator or the installer to provide a menu enabling the operator to select among different coin-time relationships, such as quarter per 15 minutes, dime for ten minutes, or nickel for five minutes. The operator can then select the coins on the remote controller at the same time as adding the coins to the parking meter. When the number and values of coins are inputted, the remote controller activates its internal timer to keep track of the remaining parking meter time.

In the remote start processes 600 and 700 described above, the parameters triggering automatic remote start can be selected by the operator/end-user of the security system, instead of or in addition to being preprogrammed by the installer. Similarly, the triggering value(s) of the selected parameters can also be selected by the operator. For example, the security system may allow the user to log into the security system through a secure password, and then, through a series of menus, enable the operator to select one or more specific parameters and set the triggering value for each of the selected parameters. The security system may allow the operator to do this from a console or keypad in the automobile, or from the remote controller. When the operator selects the parameters and the triggering values, the security system (typically the base system) stores the flags corresponding to the parameters, and the triggering values for the selected parameters.

Figure 8:
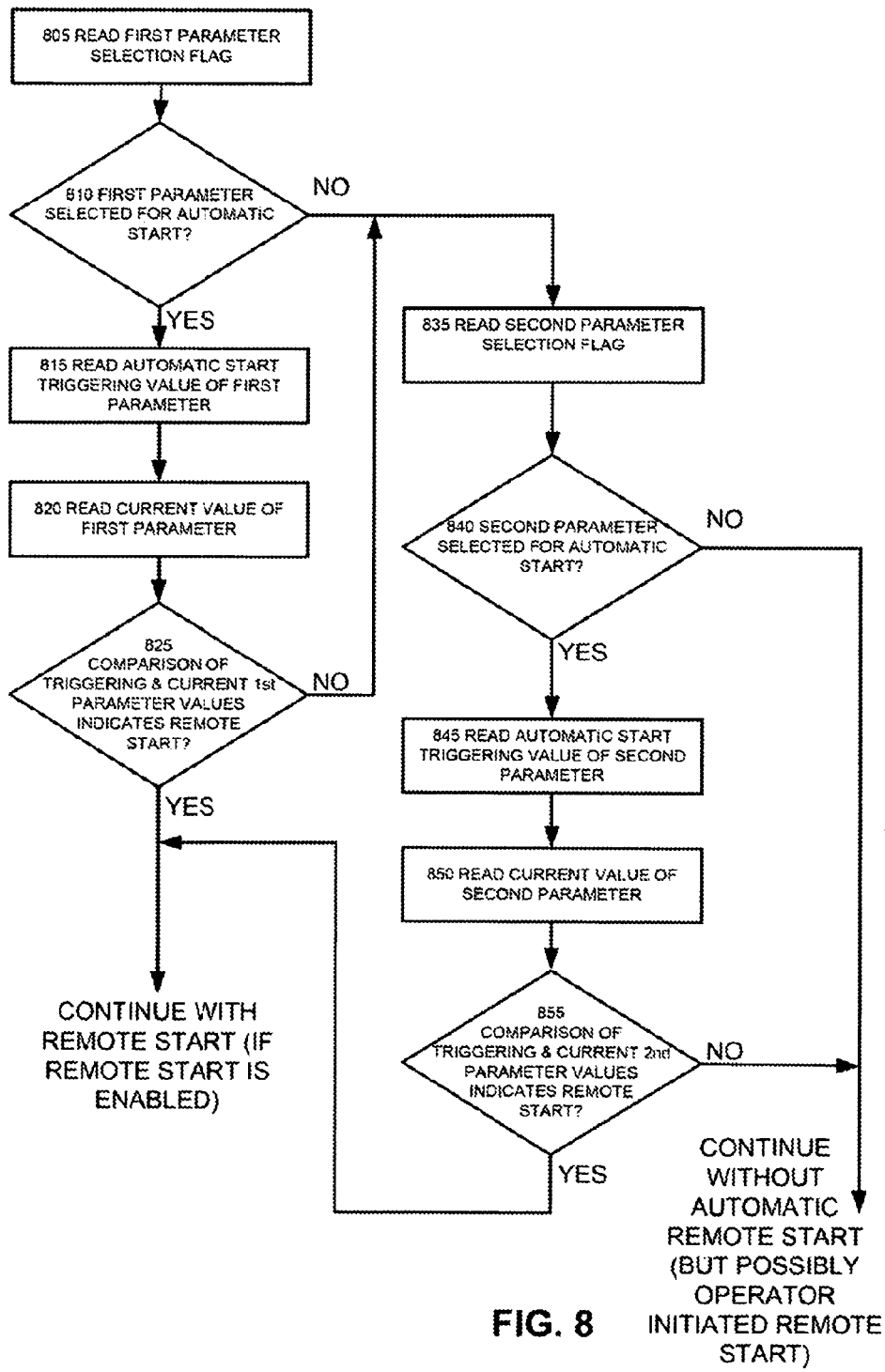

FIG. 8 illustrates selected steps of a process 800 for determining whether automatic remote start should be performed, based on the selections of the operator previously stored by the security system through an interactive (e.g., menu-driven) input procedure. The steps of the process 800 may be part of decision blocks 630 and 730.

In step 805, the security system reads a flag corresponding to a first automatic remote start parameter. In decision block 810, the security system determines (based on the flag) whether the operator had selected the first parameter as one of the parameters potentially triggering automatic remote start, i.e., whether some value(s) of the first parameter cause (or can cause) an automatic remote start. If so, in step 815 the security system reads a memory location that stores the triggering value of the first parameter, and, in step 820, reads the current value of the first parameter. For example, the current value may be time, passenger compartment temperature, engine temperature, or battery voltage, depending on the type of the first parameter. Once the system has read the triggering and the current values of the first parameter, the system performs an applicable comparison of the two values in decision block 825. Typically, the applicable comparison is predetermined for the specific parameter. For example, automatic start can be indicated if the current time exceeds the time set for automatic start (i.e., a timer has expired), passenger compartment temperature exceeds a high temperature limit, engine temperature falls below a low temperature limit, or battery voltage falls bellow a low voltage limit. Note, however, that in embodiments the system allows the operator to determine the specific comparison for each parameter, such as "less than"; "less than or equal"; "greater than"; "greater than or equal"; "equal"; "within a predetermined range"; or "outside a predetermined range."

If the test comparison criterion is met, the security system continues with the remote start decision or sequence of steps. In other words, the system may perform an automatic remote start, assuming other criteria for automatic remote start are met. See, for example, steps and decision blocks 632/634 of FIG. 6 and 780 of FIG. 7. Recall that certain conditions may prevent an automatic remote start, such as when automatic remote start is disabled because of security violations, gear engagement, or parking brake not being set.

If the decision block 825 indicates that automatic remote start should not be performed based on the first parameter, process flow advances to step 835, to read a flag corresponding to a second automatic remote start parameter. Note that if the comparison in the decision block 810 results in a determination that the first parameter is not selected for automatic remote start, process flow skips steps/block 815-825 and jumps (directly or through one or more steps that are not illustrated) to the step 835.

In decision block 840, which follows the step 835, the security system determines whether the operator had selected the second parameter as one of the parameters for automatic start. If so, the security system reads a memory location that stores the triggering value of the second parameter, in step 845, and in step 850 reads the current value of the second parameter. For example, the current value may be time, passenger compartment temperature, engine temperature, or battery voltage, depending on the type of the second parameter. Once the system has read the triggering and the current values of the second parameter, the system performs an applicable comparison of the two values, in decision block 855. (These steps and decisions may be analogous to those described above in relation to the first parameter.) If the test comparison criterion for the second parameter is met, process flow continues with the remote start decision. Otherwise, the process 800 indicates that the test(s) for automatic start are not met.

Note that remote start command is not necessarily limited to automatic start based on one or more parameters; the operator may manually issue a remote start command, which would cause the determination in the decision blocks 630/730 to be YES.

While the process 800 shows tests of two flags and their corresponding parameters, in variants any number of parameters (three, four, etc.) can be used, by adding steps/blocks analogous to the steps/blocks 805-825 for each of the added parameters, thereby extending the process 800. Also, the process 800 may be shortened to a single parameter, by deleting the steps/blocks 835-855 (with the arrow from NO of the decision block 825 going to CONTINUE WITHOUT AUTOMATIC REMOTE START).

As discussed in the BACKGROUND section, some remote controllers may be configured selectively to operate multiple base systems installed in two or more automobiles. When so configured, there is a potential that an operator may select a remote controller to operate one automobile, and then forget and attempt to operate a second automobile with the same remote controller. This problem can be solved as follows.

The remote controller and the two base systems are configured so that the base systems acknowledge each command or another signal received from the remote controller. Thus, the first base system acknowledges commands and signals it receives from the remote controller, and the second base acknowledges commands and signals the second base system receives from the remote controller. Each base system is configured not to receive or acknowledge the commands/signals sent from the remote controller to the other base system. The remote controller is configured to expect an acknowledgement within a predetermined time following sending of the command/signal. If an acknowledgement is not received, the remote controller may assume that the operator intended to operate the other base system, and then reconfigure (switch) itself to operate the second base systems. In variants, the remote controller reconfigures itself after one, two, three, or more unacknowledged commands/signals. In variants, the remote controller is operable with more than two base systems. After one or more unacknowledged command/signals, the remote controller may reconfigure itself to operate another of the preprogrammed base systems, according to a predefined base system sequence. For example, the remote controller may switch from the first base system to the second base system to the third base system, and then return back to the first base system.

In embodiments, a base system of a security system sends a notification to a remote controller of the security system in response to ignition being turned OFF in the automobile in which the base is installed. The remote controller receives the notification of ignition OFF and, in response to the notification, automatically unlocks itself. The operator can then operate the remote controller to lock the automobile right after arriving at a destination, regardless of the automatic lock of the remote controller.

In embodiments, a base system of a security system sends a notification to a remote controller of the security system in response to activation of an alarm. The remote controller receives the notification of the alarm and automatically unlocks itself. The operator can then operate the remote controller to silence the alarm promptly, without the need to unlock the remote controller.

In embodiments, a security system is configured to enable its operator to bypass any one or multiple sensors or groups of sensors. The operator can bypass the sensors either from a console of the base system, or through the remote controller, using menus, for example. In this way, the operator can selectively bypass sensors known to cause false alarms in specific circumstances, such as when the automobile is left on a busy street. The operator can return to the normal setting (sensors not bypassed) when desired, or the system may automatically return to the normal setting after a predetermined number (one or more) of arm-disarm cycles of the system.

In embodiments, a security system installed in an automobile is configured so that the base system sends to the remote controller each alarm and information describing the sensor or zone triggering each alarm. The remote controller receives the alarm and the accompanying information, and displays to the operator the specific sensor or zone that triggered the alarm. The remote controller can use animation (glass breaking, sunroof sliding, engine running, door/hood/trunk being opened) to display the alarm or can use an audible tone indicating the type of event being reported. Based on the additional alarm information, the operator can make a more informed decision whether the alarm is a false alarm. For example, the operator may see that the alarm is a vibration alarm and recall that the automobile is parked on a street with heavy truck traffic. The operator may decide to ignore such alarm. If the remote controller is outside the communication range of the base system, the system may send the information regarding the alarm when the remote controller returns within range, or in response to the operator returning to the automobile and disarming the system.

The base system may also store a record of multiple alarms with identification of the triggered sensors/zones and times of occurrence of each alarm. When the operator returns and/or disarms the system, the remote controller and/or the console of the base system may be interrogated through menus to provide to the operator a detailed report of all alarms (including sensors/zones and times) that occurred during the operator's absence. The report may incorporate animation of each of the alarms.

In embodiments and variants, the security system is configured with a CO2 sensor for measuring the level of CO2 outside or inside the automobile. When the measured CO2 level exceeds a predetermined CO2 threshold, the security system does not perform a remote start, and/or shuts off the engine following the remote start. Thus, the CO2 level not exceeding the threshold is one of the conditions for enabling or performing remote start, and also a condition for not shutting off the automobile's engine following a remote start. The CO2 sensor can be external to the automobile, and could be connected to the data or another bus of the security system.

Other external sensors can be attached to the security system in the same manner, and provide measurements affecting remote start enablement or disablement.

In embodiments and variants, the security system performs automatic remote start only after a confirmation by the operator. For example, when some parameter triggers automatic remote start, the base system sends a request for confirmation to the remote controller. The remote controller indicates (e.g., displays, sounds) the request to the operator, and the operator can confirm the automatic remote start, or not confirm it. The security system would then perform the remote start in response to the operator's confirmation, but not otherwise. The base system can send the request for confirmation at the time the parameter triggers the remote start, or shortly before, for example, five minutes before a remote start timer expires, 100 millivolts before the battery discharges to the voltage level that would trigger automatic remote start, or within one degree Celsius of the passenger compartment or engine temperature reaching their respective remote start thresholds. In embodiments, the operator can give multiple pre-confirmations at the same time, or cancel multiple preprogrammed remote starts at the same time. When leaving an automobile in a parking garage for several days, the operator can, for example, pre-confirm (or cancel) for the next N days, so that the security system would perform (or not perform) remote start for the number of days the operator is expecting to be away from the automobile.

Although certain process steps and decisions are shown in the Figures and described throughout this document serially, some steps/decisions can be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step may be required in every embodiment, while some steps that have not been specifically illustrated may be desirable or necessary in some embodiments in accordance with the invention.

In embodiments, the method steps described may be implemented in hardware, software, firmware, or any combination of hardware, software, and/or firmware. If implemented in software, the steps may be stored on computer-readable media, such as RAM, ROM, EEPROM, flash memory, CD-ROM, DVD-ROM, other optical disk storage, magnetic disk storage or other magnetic storage devices, or any other medium that can be used to store information and instructions and that can be read by a computer.

This document describes the inventive security systems and some of their features in considerable detail for illustration purposes only. Neither the specific embodiments of the invention as a whole, nor those of its features limit the general principles underlying the invention. Embodiments and variants may provide for transmission of authentication or authorization codes, in addition to transmission of control and/or monitoring data. The invention is also not limited to automotive security system uses, but extends to other applications, including other vehicular security systems. It should be noted that the particular displays, sounding devices, and input devices used in the described embodiments need not constrain the general principles of the invention, because other displays, sounding devices, and other input devices can be successfully implemented in embodiments and variants of the invention. The type of audible signals sounded by the remote controllers is not limited to simple sounds, such as beeps and chirps, but can include synthesized voice. The specific features described herein may be used in some embodiments, but not in others, without departure from the spirit and scope of the invention as set forth. Various physical arrangements of components and various links connecting remote controllers to their base systems also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is generally served by current and future claims and their equivalents.

What is claimed is:

1. A security system comprising:
a base system; and
a remote controller having means for providing user inputs; wherein:
   the base system is installed in a vehicle,
   the base system is configured to send a signal to the remote controller in response to a change in preset condition parameters of a plurality of vehicle systems,
   the remote controller is configured to automatically lock the means for providing user inputs, and in response to receipt of the signal, unlock said means for providing user inputs.

2. The security system of claim 1,
wherein: the remote controller is further configured to automatically lock the means for providing user inputs upon the lapse of a pre-determined time interval.

3. The security system of claim 1,
wherein: the remote controller is further configured to automatically lock the means for providing user inputs upon the failure of the remote controller to receive a signal from the base system because the remote controller is out of transmission range of the base system.

4. A security system comprising:
a base system; and
a remote controller having means for providing user inputs; wherein:
   the base system is configured to send a signal to the remote controller in response to a change in status of an alarm condition,
   the remote controller is configured to automatically lock the means for providing user inputs and unlock said means for providing user inputs in response to receipt of the signal.

5. A security system comprising:
a base system; and
a remote controller having means for providing user inputs; wherein:
   the base system comprises a plurality of sensors,
   the base system is configured to send a signal to the remote controller in response to an alarm event caused by the triggering of any of the sensors, the signal identifying the sensor causing the alarm,
   the remote controller is configured to automatically lock the means for providing user inputs, and in response to receipt of the signal, to unlock said means for providing user inputs in response to receipt of the signal and to present information regarding the sensor causing the alarm.

6. A security system comprising:
a base system; and
a remote controller having means for providing user inputs; wherein:

the base system comprises a plurality of sensors, the base system is configured to send a signal to the remote controller in response to an alarm event caused by the triggering of any of the sensors, the signal identifying the sensor causing the alarm, the remote controller is configured to automatically lock the means for providing user inputs, and in response to receipt of the signal, to unlock said means for providing user inputs and to present information regarding the sensor causing the alarm, the security system is configured to enable an operator to selectively bypass any sensor by inputting into the means for user inputs a sensor bypass command and the remote controller transmitting the sensor bypass command to the base system, and upon receipt of the sensor bypass command the base system disabling the selected sensor.

7. The security system of claim 6,
wherein: the disabled sensor is restored when the security system is deactivated and then activated.

8. The security system of claim 6,
wherein: the security system is configured to transmit to the remote controller a sensor disabled confirmation message.

9. The security system of claim 6,
wherein: the security system is configured to display on the remote controller animations corresponding to different sensor triggered alarms events.

10. A security system comprising:
A plurality of base systems, with at least one base system installed in a vehicle and at least one base system installed in a building, each base system in wireless communication with each other; and
a remote controller;
wherein:
the security systems is configured to store information of all alarm events, corresponding alarm event times and associated sensor zones that triggered an alarm that occurs during a period of the security system being in an armed state and further configured to wirelessly communicate a report of the stored information to the remote controller.

11. A security system comprising:
a base system installed in a vehicle; and
a remote controller;
wherein:
the security system is configured for remote start of the vehicle, and
the security system is configured to monitor vehicle system parameters, and disables a remote start signal if the conditions of the vehicle system parameters exceed a preset values, the security system further configured to provide a signal to the remote controller when a remote start function is disabled, and to provide a signal to the remote controller when the remote start function is enabled.

12. The security system of claim 11,
wherein: the security system is further configured to provide a signal to the remote controller indicating the vehicle systems parameters that exceeded the preset value.

13. The security system of claim 11,
wherein: the security system is further configured to issue a vehicle start command if the conditions of the vehicle systems parameters do not exceed the preset values.

14. The security system of claim 11,
wherein: the security system is further configured to provide a signal to the remote controller indicating the vehicle system parameter that exceeded the preset value.

15. A security system comprising:
a base system installed in a vehicle with a manual transmission; and
a remote controller;
wherein:
the security system is configured for remote start of the vehicle, and
the security systems is configured to monitor vehicle ignition system, breaking system, transmission shift position and door pin triggering parameters, and configured to disables the remote start signal if a condition of the vehicle systems parameters exceed a preset value,
the security system further configured to provide a message to the remote controller when the remote start function is disabled, and to provide a signal to the remote controller when the remote start function is enabled.

16. A security system comprising:
a first base system installed in a first vehicle;
a second base system installed in a second vehicle, and
a remote controller;
wherein:
the remote controller is configurable to operate the first base system or the second base system and is configured to receive acknowledgement from the first and second base system of each communication from the remote controller to the first base system or second base system; and
the remote controller is configured to switch from operating the first base system to automatically operating the second base system in response to a failure of acknowledgement of a communication sent from the remote controller to the first base system.

* * * * *